US 7,221,654 B2

(12) United States Patent
Tang

(10) Patent No.: US 7,221,654 B2
(45) Date of Patent: May 22, 2007

(54) APPARATUS, AND ASSOCIATED METHOD, FOR SELECTING RADIO COMMUNICATION SYSTEM PARAMETERS UTILIZING LEARNING CONTROLLERS

(75) Inventor: Clive Tang, Irving, TX (US)

(73) Assignee: Nokia Corporation, Espoo (FI)

( * ) Notice: Subject to any disclaimer, the term of this patent is extended or adjusted under 35 U.S.C. 154(b) by 845 days.

(21) Appl. No.: 10/008,094

(22) Filed: Nov. 13, 2001

(65) Prior Publication Data

US 2003/0091004 A1    May 15, 2003

(51) Int. Cl.
*H04J 3/14*      (2006.01)
*G06F 15/18*   (2006.01)

(52) U.S. Cl. .......................... 370/252; 706/16; 706/21

(58) Field of Classification Search ................ 370/252, 370/241, 254, 255, 203, 204, 205, 206, 310, 370/329, 332, 334, 212, 213, 215, 341; 706/45, 706/1, 14, 15, 16, 25, 900, 61, 2; 329/318, 329/320, 349, 353; 332/106, 107, 123, 159; 455/63, 226.1, 222, 67.3, 50.1, 278.1, 296; 375/259, 348, 260, 377, 267, 224, 285–295, 375/296, 325, 316, 340, 346, 347, 232, 265, 375/266, 292, 334, 341, 227, 299
See application file for complete search history.

(56) References Cited

U.S. PATENT DOCUMENTS

| | | | | |
|---|---|---|---|---|
| 4,512,034 A | * | 4/1985 | Greenstein et al. ......... | 455/139 |
| 5,666,370 A | * | 9/1997 | Ganesan et al. ............. | 714/752 |
| 5,740,206 A | * | 4/1998 | Lomp et al. ................. | 375/346 |
| 6,009,122 A | * | 12/1999 | Chow .......................... | 375/260 |
| 6,128,349 A | * | 10/2000 | Chow .......................... | 375/260 |
| 6,320,918 B1 | * | 11/2001 | Walker et al. ............... | 375/346 |
| 6,351,499 B1 | * | 2/2002 | Paulraj et al. ............... | 375/267 |
| 6,408,033 B1 | * | 6/2002 | Chow et al. ................. | 375/260 |
| 6,614,858 B1 | * | 9/2003 | Pekarich et al. ............ | 375/340 |
| 6,625,226 B1 | * | 9/2003 | Gersho et al. .............. | 375/285 |
| 6,882,992 B1 | * | 4/2005 | Werbos ....................... | 706/48 |
| 6,904,110 B2 | * | 6/2005 | Trans et al. ................. | 375/350 |
| 2003/0016770 A1 | * | 1/2003 | Trans et al. ................. | 375/346 |
| 2003/0086515 A1 | * | 5/2003 | Trans et al. ................. | 375/346 |
| 2003/0149675 A1 | * | 8/2003 | Ansari et al. ................. | 706/2 |

* cited by examiner

*Primary Examiner*—Chi Pham
*Assistant Examiner*—Ronald Abelson
(74) *Attorney, Agent, or Firm*—Alston & Bird LLP

(57) ABSTRACT

Apparatus, and an associated method, for selecting operational parameters pursuant to which a radio communication system is operable. The operational parameters form, for instance, adaptive switching thresholds used in an adaptive modulation scheme. Separate learning controllers are configured to operate independently and cooperatively to select the adaptive switching thresholds, or other operational parameters. Iterative operation of the learning controllers causes the values to converge to optimal values.

21 Claims, 3 Drawing Sheets

APPARATUS, AND ASSOCIATED METHOD, FOR SELECTING RADIO COMMUNICATION SYSTEM PARAMETERS UTILIZING LEARNING CONTROLLERS

The present invention relates generally to a manner by which to select operational parameters, such as adaptive modulation switching thresholds, pursuant to which a performance function in a radio communication system is operable. More particularly, the present invention relates to apparatus, and an associated method, by which learning controllers are utilized to select optimal values of the operational parameters to optimize system performance, such as to optimize data throughput rates. Decentralized learning functions are performed using game-theory techniques in which independent, cooperative learning controllers, e.g., learning automata, are used to select the values of the operational parameters.

BACKGROUND OF THE INVENTION

The use of communication systems through which to communicate data in separate locations is a pervasive adjunct of modem society. Many different types of communication systems have been developed and implemented to be used to effectuate the communication of data between two or more locations.

New types of communication systems have been proposed, developed, and implemented that make use of advancements in communication technologies. Radio communication systems are exemplary of communication systems which have benefited from the advancements in communication technologies. New types of radio communication systems have been proposed, developed, and implemented that take advantage of such advancements in communication technologies. Improvements to existing types of radio communication systems have also been made possible as a result of the advancements in communication technologies.

Increased communication mobility is inherent in a radio communication system. Unlike a conventional, wireline communication system, a wireline connection is not required to be maintained between endpoints, i.e., sending and receiving stations, of the communication system. Radio links, instead, are used upon which to define communication channels upon which to communicate data between the endpoints.

The advancements in communication technologies, include, for instance, advancements in digital communication techniques. The use of digital communication techniques permits the communication capacity of a communication system to be increased, as well as also to improve the quality levels of communications effectuated in the communication system.

Data that is to be communicated in a digital communication system is digitized. Once digitized, the digitized data is formatted, such as into data packets or frames, and converted into a form to permit its communication upon the communication channel. In an ideal communication system, the data packets, subsequent to transmission upon the communication channel and received at a receiving station, are substantially identical in value to the corresponding data packets prior to their communication upon the communication channel. In an actual communication system, however, distortion is introduced upon the data during its communication upon the communication channel such that the values of the data, when received at a receiving station, differ, in part, with corresponding values of the data packets prior to their communication upon the communication channel. If the amount of distortion is significant, the informational content of the data cannot be recovered at the receiving station.

Multi-path transmission, for instance, causes fading of the data. Such fading might alter the values of the symbols of a data packet during its transmission upon the communication channel. If the alteration in the values is not properly corrected, resultant communication quality levels of the communications are, at a minimum, reduced.

Fading of the data upon the communication channel is not necessarily, and, quite likely, is not, constant. That is to say, the fading conditions vary as a function of time. During a single communication session, for instance, the fading conditions upon the communication channel might differ significantly.

Various techniques are utilized to ensure better that the data originated at a sending station is received at a receiving station of signal quality levels that permit the informational content of the data to be recreated. The complexity of the modulation by which the data is modulated at a sending station, prior to its communication upon the communication channel to the receiving station, is selected pursuant to the fading conditions upon the communication channel. If significant levels of fading are exhibited upon the communication channel, a reduced-complexity modulation technique is used to modulate the data. And, when the communication channel exhibits relatively low amounts of fading, an increased-complexity modulation techniques can, instead, be utilized. Adaptive modulation schemes have been proposed by which to adaptively select the modulation complexities by which to modulate the data, responsive to channel conditions of the communication channel. Other operational parameters of communication systems have analogously also been proposed.

Selection of the operational parameters, such as the modulation complexity level, by which data is communicated, is sometimes problematic.

Utilization of conventional information-theory techniques by which to select the operational parameters are sometimes unable to be utilized in a radio communication system. When deterministic analytical techniques are utilized, only basic scenarios are able to be adequately modeled. Fast multi-path fading conditions on the communication channel might well be beyond the capability of control utilizing the deterministic analytical techniques. Heuristic approaches are sometimes unable to be used to select operational parameters in an optimal manner. Existing control schemes are, therefore, sometimes inadequate to select the operational parameters.

An improved manner by which to select the operational parameters, such as the adaptive modulation switching thresholds used in an adaptive modulation scheme, is, therefore, required.

It is in light of this background information related to the selection of operational parameters in a radio communication system that the significant improvements of the present invention have evolved.

SUMMARY OF THE INVENTION

The present invention, accordingly, advantageously provides apparatus, and an associated method, by which to select one or more operational parameters pursuant to which to perform a function in a radio communication system.

Through operation of an embodiment of the present invention, learning controllers are utilized to select optimal values of the operational parameters to permit, thereby, optimization of system performance. System optimization is defined, for instance, as optimization of data throughput rates in the communication system or pursuant to a communication session.

The decentralized learning functions are performed using game-theory techniques in which independent, cooperative learning controllers, for example, learning automata, are used to select the values of the operational parameter.

In one aspect of the present invention, a novel use of the decentralized learning control and cooperative game for a multiple-parameter optimization in mobile communication technologies is provided. The parameters are adjusted, thereby to be optimized, through operation of the decentralized learning control and cooperative games. The learning control through the cooperative games is performed by a team of learning controllers that operate in a decentralized manner, but in a cooperative fashion, to optimize a common performance goal.

Thereby, a decentralized learning control scheme is provided to adjust a set of parameters so as to maximize a performance function. A number of independent controllers are utilized, one controller for each parameter, configured in a cooperative game mode. In a cooperative game mode, the controllers are regarded as players of a sequential game with an operating environment. At each play of the game, each player, i.e., controller, chooses an action based upon a selected strategy, and an indication of the chosen action is provided to the environment. In response to the set of actions chosen by the controllers, the environment returns to the controllers a common payoff, i.e., outcome, as a performance measure to direct the learning process. The "learned" information is considered as an experience of the controller to improve the quality of control whenever similar situations occur. Through suitable mapping of the desired performance function as the outcome, and then choosing an appropriate learning controller, multiple parameter optimization is carried out for a system, such as a mobile radio communication system, operable in a random environment. Time-varying fading exhibited upon communication channels in a radio communication system are exemplary in a random environment.

In another aspect of the present invention, learning controllers are based upon stochastic learning automata, whose ability to perform parameter optimization has been demonstrated in both uni-modal and multi-modal performance criteria systems. To optimize n-parameters, a team of n-automata is utilized. At each play of a game, each automaton chooses its action independently, thereby creating a unique set of combinations of the end-parameter values. The environment evaluates the combination of parameter values by way of a performance function, and an identical payoff is returned to all the automata. Each automaton then updates its internal probability vector that governs the selection of action in the next play, using the learning algorithms associated with the respective ones of the automata.

Analytical modeling or a priori knowledge of the operating environment is not required to optimize the parameters. And, relative to conventional heuristic techniques, improved performance of optimal parameter selection is possible. By properly choosing the learning algorithms utilized by the automatons, the team of automata converges to the combination of parameter values that optimize the performance function.

When a team of automata are used to carry out optimization, each automaton controls one parameter. Data frames, communicated during a communication session are regarded as plays of the games. Transmission of each frame is regarded as a single play of the game. And, a chosen performance measure, for example a long term data throughput, is used as the common pay-off to the team of automata. As the successive ones of the frames are transmitted, the game is repeatedly played, and changes to the operational parameters are successively made by the players, i.e., the automata. The common target for all the players is to optimize the performance measure chosen, for example to maximize the data throughput. The decentralized learning control strategy achieves this goal while also offering a quicker convergence than use of a single controller.

In one implementation, the communication system is operable pursuant to an adaptive modulation scheme. Different modulation techniques are used depending upon channel conditions. During periods of high amounts of fading, the modulation complexity is reduced. And, during periods exhibiting lessening levels of fading, increased complexity modulation schemes are instead utilized. Switching thresholds define the boundaries of channel conditions separating selection of the different modulation schemes. By adaptively selecting the switching thresholds, data throughput during operation of the communication system can be optimized. The learning automata are used to select the switching thresholds defining such boundaries. In other implementations, other performance parameters are alternately optimized.

In these and other aspects, apparatus, and an associated method, is provided for a radio communication station having a received portion operable to receive data communicated thereto upon a radio channel susceptible to distortion. Selection of a value of a first parameter and a value of at least a second parameter by which to operate upon the receive data once received at the communication station is facilitated. A first learning controller is coupled to the receive portion to be provided with a performance measure representative of operation of the receive portion upon a set of successively-received sequences of the receive data received at the communication station. The first learning controller iteratively selects the value of the first parameter responsive to the performance measure associated with each of the successively-received sequences of the set. Each successive performance measure identifies a first parameter value. At least a second learning controller is also coupled to the receive portion to be provided with the performance measure representative of operation of the receive portion upon the set of the successively-received sequences of the receive data received at the communication station. The second learning controller iteratively selects the value of the second parameter responsive to the performance measure associated with each of the successively-received sequences of the set. Each successive performance measure identifies a second parameter value.

A more complete appreciation of the present invention and the scope thereof can be obtained from the accompanying drawings which are briefly summarized below, the following detailed description of the presently-preferred embodiments of the present invention, and the appended claims.

DETAILED DESCRIPTION

Figure 1:
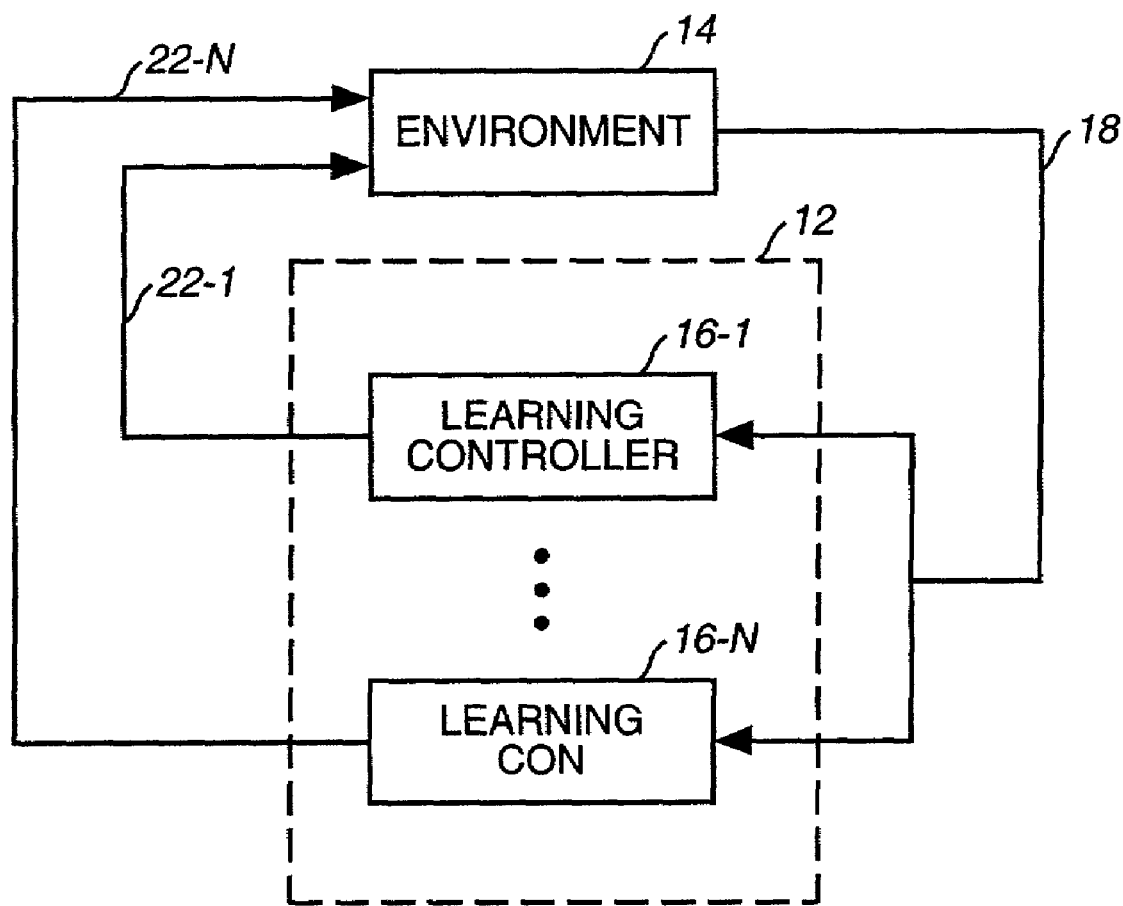
FIG. 1 illustrates a functional block diagram of apparatus configured to perform learning control operations pursuant to a cooperative game theory utilized during operation of an embodiment of the present invention.

Referring first to FIG. 1, a system, shown generally at 10, includes apparatus 12 that is operable to select and adjust a set of parameters used during operation of an environment 14. In the exemplary implementation, the system 10 forms a communication system, and the apparatus 12, is embodied in the communication system.

The apparatus 12 includes a plurality of learning controllers 16, of which two controllers 16-1 and 16-n are shown in the figure. Two or more learning controllers are embodied by the apparatus 12. Each of the learning controllers is provided the same information, here represented to be provided thereto by way of the line 18. The learning controllers operate independently pursuant to a selected strategy and selects courses of action responsive thereto. Indications of the courses of action selected by the separate ones of the learning controllers are here represented to be generated on the lines 22 to provide the indications to the environment 14. Responsive to the courses of action, actions are taken at the environment, and subsequent values generated on the line 18 are a game provided to the learning controllers of the apparatus. Iterative actions are selected by the learning controllers in an iterative process by which the actions are chosen responsive to values provided to the learning controllers.

The operation of the apparatus 12 is representative of game theory. Game theory techniques are utilized to provide decentralized operation of the apparatus, and decentralized operation is oftentimes a necessary adjunct of control operations in complex systems. Decentralized operation is sometimes required as complete information exchange needed for centralized decision-making is practically difficult or unfeasible. Analysis and synthesis of problems in decentralized control are provided by game theory techniques. Systems involving many decision makers acting in a decentralized manner are describable by suitable models pursuant to game theory. The game consists of at least two players, here the learning controllers, and the outcome is dependent upon the behavior of the players. Generally, game theory techniques are utilized in a game played either as a single stage decision problem or repeatedly as a sequential decision problem. Depending upon the rules of the game, the game is classified as non-cooperative when the players have a conflict of interest, or cooperative when the players share a common goal.

Here, the apparatus 12 of the system 10 is configured to provide decentralized learning to adjust a set of parameters used in the environment 14. The number of learning controllers of the apparatus is associated in, here, a one-to-one correspondence with the number of parameters that are to be adjusted. The controllers 16 are configured in a cooperative game mode, and the controllers are regarded as players of a sequential game that is played with the environment 14.

At each play of the game, each learning controller chooses an action from a set of actions based upon strategies associated with respective ones of the learning controllers. In response to the combination of actions, the environment 14 returns to the learning controllers by way of the line 18, a common payoff, i.e., outcome. The common payoff is treated as a performance measure to direct the learning process of the learning controllers. The "learned" information is considered as an experience of the players, i.e., learning controllers, and the experience is used to improve the quality of control when similar situations subsequently occur. At each play, a learning controller is aware only of its strategy, its chosen action, and the outcome result. A learning controller remains unaware of information about others of the learning controllers, including the number of actions of the other learning controllers, the actions chosen by such other learning controllers, and the responses received by the other learning controllers after each play. A learning controller also remains unaware of the number of other learning controllers involved, strategies available to others of the learning controllers, and a payoff function to such other learning controllers. At each stage, each learning controller is aware only of the strategy associated with the learning controller and the corresponding random response, i.e., payoff, of the environment. The strategy decided by a learning controller is made completely separate and independent from other learning controllers, but here share the same objective of maximizing an expected common outcome. Through suitable mapping of the desired performance function as an outcome, and thereafter choosing an appropriate learning controller, multiple parameters are able to be optimized for the environment.

Figure 2:
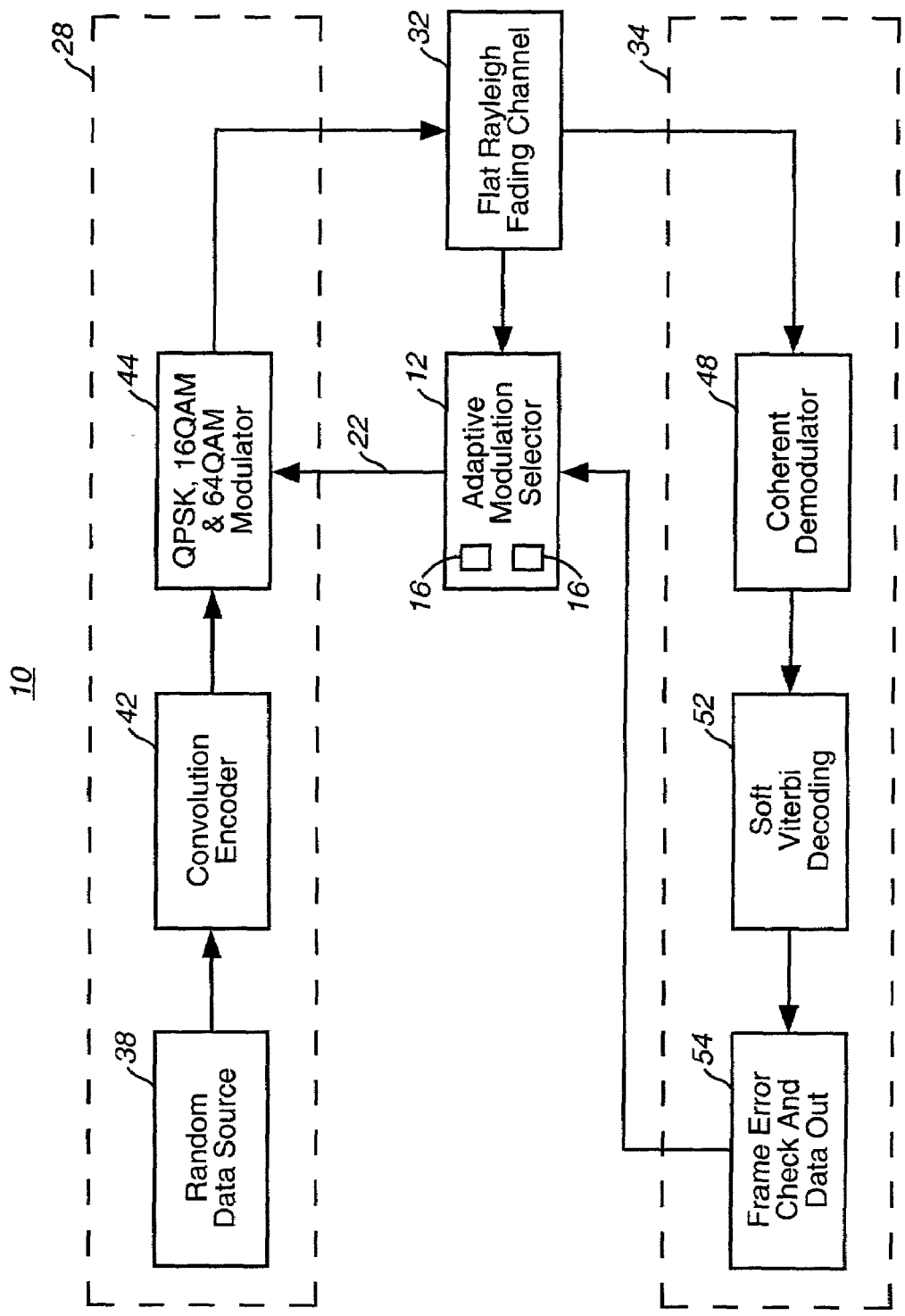
FIG. 2 illustrates a functional block diagram of an exemplary communication system in which an embodiment of the present invention is operable.

FIG. 2 illustrates an implementation of the system as a communication system in which data sourced at a sending station 28 is sent upon a channel 32 to a receiving station 34 to be terminated thereat. The channel 32 exhibits fading conditions, for example flat Rayleigh fading, that distorts the values of the data communicated thereon. The apparatus 12 here forms an adaptive modulation selector, and the communication system selectably utilizes an adaptive modulation scheme by which to modulate data that is communicated by the sending station to the receiving station. The apparatus 12 is embodied at either of the sending and receiving stations, distributed therebetween, or positioned in whole or in part, elsewhere.

The data originated at the sending station is sourced at a random data source 38. As information is non-determinative, data forming information is referred herein as random data. The data sourced at the data source 38 is encoded, hereby a convolutional encoder 42. Convolutionally-encoded data is provided to a modulator 44. The modulator 44 is an adaptive modulator, capable of modulating the data provided thereto according to more than one modulation scheme. Here, the modulator is capable of modulating the data pursuant to three separate modulation schemes, a QPSK (Quadrature Phase Shift Key) scheme, a 16 QAM (16-Quadrature Amplitude Modulation) scheme, and a 64 QAM (64-Quadrature Amplitude Modulation) scheme. Higher-level modulation is utilized during good channel conditions, and lower-level modulation is utilized during poor channel conditions.

Once modulated, the data is communicated upon the channel 32 to the receiving station 34. The receiving station includes a coherent demodulator 48 operable to demodulate the data received at the receiving station, a decoder 52 for performing soft viterbi decoding, and a frame error checker and data out device 54. Indications of the number of frame errors determined by the frame error checker are provided to the learning controller 16 of the apparatus 12, here on the line 56. Responsive to indications of the frame error indicia provided thereto, the learning controllers operate independently, and cooperatively, and take actions, indications of which are generated on the lines 22. The values generated on the lines 22 are of adaptive threshold levels defining switching thresholds between the separate modulation schemes by which the data can be modulated by the modulator 44. Sets of thresholds are generated upon the lines 22 to define the thresholds determining which modulation schemes are used by the modulator 44.

The learning controllers 16 are operable based on stochastic learning automata, whose ability to perform parameter optimization is well-demonstrated, even in multi-modal performance criteria systems where gradient-based methods fail to pick up the global extremum. A learning automaton forming a controller 16 possesses the powerful capability to gain sufficient knowledge of a process, especially under noisy conditions where no or little a priori information is available, by on-line observation only. The automaton learns from past observations and extracts information to improve the quality of control whenever similar control situations occur again. In communication systems terms, this feature translates into the elimination of training sequences, and thus reduces the overhead and increases the net data flow.

In general, a stochastic learning automaton may be defined as an element which interacts with a random environment in such a manner as to improve a specific overall performance by changing its action probabilities dependent on responses received from the environment. An automaton is a quintuple $\{\beta, \psi, \alpha, F, G\}$ where $\beta=\{0,1\}$ is the input set (output from the environment), $\psi=\{\psi^1, \psi_2, \ldots, \psi_s\}$ is a finite stage set and $\alpha=\{\alpha_1, \alpha_2, \ldots, \alpha_r\}$ is the output action set (inputs to the environment). F: $\psi \times \beta \rightarrow \psi$ is a state transition mapping and G: $\psi \rightarrow \alpha$ is the output mapping.

In an exemplary implementation, a variable structure automaton is used, described by the triple $\{\beta, T, \alpha\}$. Here T denotes the rule by which the automaton updates the probability of selecting certain actions. At stage n assuming r actions each selected with probability $p_i(n)$ (i=1, 2, ... ,r) is represented as:

$$p_i(n+1)=T[p_i(n),\alpha(n),\beta(n)]$$

A binary random environment, also known as a P model, is defined by a finite set of inputs $\alpha$: $(\alpha_1, \alpha_2, \ldots, \alpha_r)$ (outputs form the automaton), an output set $\beta=(0,1)$ and a set of penalty probabilities $c=(c_1, c_2, \ldots, c_r)$. The output $\beta(n)=0$ at stage n is called a favorable response (success) $\beta(n)=1$ an unfavorable response (failure). The penalty probabilities are defined as:

$$c_i=\text{Prob}[\beta(n)=1|\alpha(n)=\alpha_i]$$

Both linear and non-linear forms of updating algorithms T are considered. The most widely used are the class of linear algorithms which include linear reward/penalty (LRP), linear reward/Epenalty (LR∈P) and linear reward/inaction (LRI). For the LRP scheme if an automaton tries an action $\alpha_i$ which results in success, $p_i(n)$ is increased and all other $p_j(n)$ (j≠i) are decreased. Similarly if action $\alpha_I$ produces a penalty response, $p_i(n)$ is decreased and all other $p_j(n)$ modified to preserve the probability measure. A LRI scheme ignores penalty responses from the environment and LR∈P only involves small changes in $p_j(n)$ compared with changes based on success. Important convergence results are possible through use of such algorithms.

For optimization of N-parameters, a team of N-automata formed of learning controllers 16-1 through 16-N are employed, one automaton for one controller, and one controller for one parameter. Each of the N-parameters is required to be partitioned, i.e., discretized, into a number of regions, with one region mapping into one output action of an automaton. The automata may have different number of actions among them, i.e. the N-parameters do not need to be uniformly partitioned. At each play of the co-operative game each automaton chooses its action independently, producing a unique set of combination of the N-parameters values. The environment evaluates this combination of parameter values via the performance function, and returns an identical pay-off to all the automata. Based on this pay-off only each automaton updates its internal probability vector, which governs the selection of action in the next play, with its own learning scheme. It can be shown that by choosing the proper learning schemes of all the automata, the expected gain will increase monotonically at every stage resulting in the convergence to the best combination of actions. In other words, convergence to the combination of parameter values that optimizes the performance function can be achieved.

To illustrate this decentralized learning control scheme, the exemplary implementation optimizes switching thresholds in adaptive modulation. The basic idea of adaptive modulation is to switch the modulation schemes according to the channel conditions so as to maximize the data throughput and/or system capacity. The channel quality is typically assessed by the instantaneous signal-to-noise ratio (SNR), whose range is partitioned into a number of fading regions, with a specific modulation (and coding) scheme assigned to each region. Therefore the determination of the region boundaries, or switching thresholds, which decide when to alter between the modulation schemes, is a fundamental issue in adaptive modulation.

To investigate this application a simulation system has been established as a general test bed that allows various areas to be studied including modulation selection, throughput performance and error coding etc. The convolution encoder forming a part of the sending station taken from a cdma2000 specification has a constraint length K=9 and rate R=½. A frame of data covers 184 bits, adding 8 tailing bits an encoded frame thus contains 384 symbols (encoded bits). The modulator block modulates the encoded data using either QPSK, 16QAM and 64QAM. Hence during a frame burst either 1, 2 or 3 frames of data are sent to the fading channel depending on the modulation scheme selected. A single path flat fading channel is used with a Doppler frequency of 5 Hz. It may be assumed that the channel stays in the same condition for the entire frame burst because of the slow fading. Assuming perfect channel estimation, coherent demodulation is performed at the receiver which is followed by soft Viterbi decoding to recover the transmitted data bits.

The Adaptive Modulation Selector formed of the apparatus 12 monitors the instantaneous fading channel gain at the beginning of each frame burst and the number of error frames in the preceding burst. The latter is used in conjunction with the number of frames transmitted to estimate the frame error rate (FER), frames transmitted per burst (FPB) and the throughput (TP). The goal of the selector is to select the appropriate modulation scheme, in a frame-burst-by-frame-burst basis according to the instantaneous channel gain, so as to maximize the long term average TP which is defined as (1−FER)*FPB. For the present configuration there are three switching thresholds to be determined—from no transmission to QPSK (threshold L1), from QPSK to 16QAM (threshold L2), and from 16QAM to 64QAM (threshold L3). In a conventional adaptive modulation controller these switching thresholds are fixed and with which the instantaneous SNR compared to select the modulation scheme. The average BER, FER and TP can vary a lot by altering even one of the switching thresholds. This, coupled with the time-varying nature of a RF channel, indicates what would be desired is an on-line adaptive scheme that tailors the switching thresholds dynamically to maximize the throughput (or other criteria) as the data transmission goes on. Furthermore, because of the difficulties in deriving TP as an analytical function of L1, L2 and L3, it would be advantageous to use a self-learning method that does not utilize expressions of TP and the thresholds, nor makes any assumption of the operating environment. It would also be attractive not to use any dedicated training sequence in order to reduce overhead.

The decentralized learning control scheme is therefore seen to be a suitable candidate for such an application. The performance function here is the data throughput TP and the aim is to maximize it by adjusting the switching thresholds. The optimization is performed by a team of three automata, with one automaton controls one threshold. Each threshold is partitioned into a number of values, with each value maps into one automaton output action. For a team of 3-automata, each of M-actions, a total of $M^3$ combinations of threshold values are thus possible. The task of the team is to choose a combination of thresholds, via playing a sequential game, to maximize TP. Each data frame transmitted is regarded as one play of the game. The average long term TP achieved is evaluated and returned as the common pay-off to the team of automata. Based solely on the pay-off each automaton uses its own learning algorithm to update its internal probability vector. The team of automata operates in a truly decentralized manner—at any time an automaton is only aware of its learning strategy, its action chosen and the outcome resulted. It does not have any information about the other automata. As the data transmission goes on, the game is played repeatedly, TP is continuously monitored and the switching thresholds dynamically updated by the team of automata.

To demonstrate the effect of varying the switching thresholds on the data throughput, as well as to obtain a set of reference results, the test bed was run for a set of fixed threshold combinations under several SNR. Each of the threshold L1, L2 & L3 is partitioned, e.g., into 4 values, resulting in a total of 64 different combinations. L1 ranges, e.g., from 0.2 to 1.4 dB, L2, e.g., from 5.4 to 6.6 dB, and L3, e.g., from 9.6 to 10.8 dB. For a low SNR, L1 is expected to have a critical effect on all of BER, FER and TP since it dictates whether or not to transmit the frame burst. If a frame of data is transmitted and corrupted, it will result in an increase in BER and FER. On the other hand if it is not transmitted FPB will be reduced. For higher SNR, the dominant effect of L1 gradually decreases and the difference in TP between different threshold combinations becomes smaller, since the data frames are less likely to be corrupted.

In another exemplary implementation, the decentralized learning scheme is implemented in the Adaptive Modulation Selector block of the test bed and applied to carry out the optimization. A co-operative team of three automata is used, each automaton uses a LRI learning algorithm, has 4 actions and controls one threshold only. The transmission of each data frame represents one single play of the sequential game, as well as one iteration of the optimization scheme. Each of the three automata converges to the proper action such that the set of three actions together represents the best combination of switching threshold values. In cases when there are more than one best combinations available, the team of automata converged to one of them.

Figure 3:
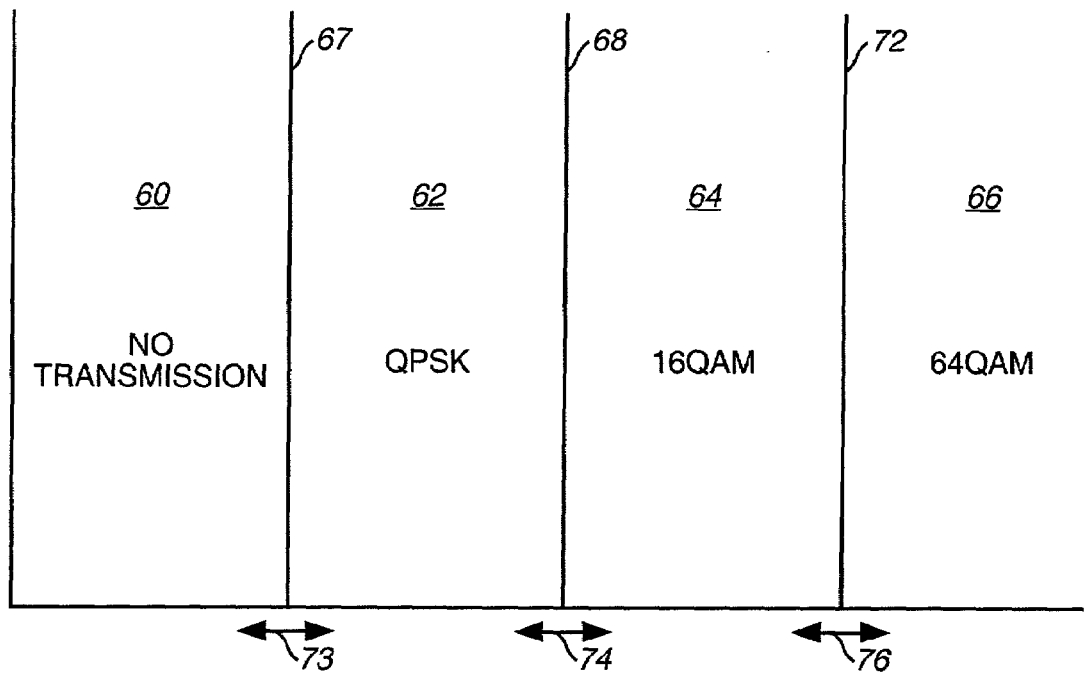
FIG. 3 illustrates a representation of an adaptive modulation scheme in which adaptive thresholds are selected to optimize communications in a communication system.

FIG. 3 illustrates a representation of the adaptive thresholds selected pursuant to operation of the apparatus 12 shown in preceding figures pursuant to an exemplary implementation of the present invention. Here, a no-transmission area 60 is shown. And separate modulation areas, modulation areas 62, 64, and 66, representative QPSK, 16 QAM, and 64 QAM modulation areas, respectively, are also shown. Line 67 separates the no transmission area 60 and the QPSK modulation area 62. and, lines 68 and 72 separate the areas 62, 64, and 66, respectively. The learning controllers select the threshold levels from a set of selectable threshold levels wherein the ranges are indicated by the arrows 73, 74 and 76. Through appropriate selection of the thresholds 67, 68 and 72, improved data throughput during operation of the communication system is possible.

Figure 4:
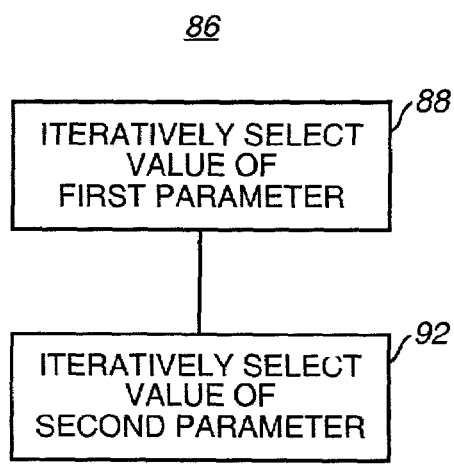
FIG. 4 illustrates a method flow diagram listing the method of operation of an embodiment of the present invention.

FIG. 4 illustrates a method, shown generally at 86, of the method of operation of an embodiment of the present invention. The method 86 facilitates selection of a value of a first parameter and a value of at least a second parameter by which to operate upon received data received at a communication station.

First, and as indicated by the block 88, a value of a first parameter is iteratively selected responsive to performance measure associated with each successively-received sequence of a set of successively-received sequences received at the communication station. Each successive performance measure identifies a first parameter value. And as indicated by the block 92, a value of a second parameter is iteratively selected. The value is selected responsive to the performance measure associated with each successively-received sequence of the set. Each successive performance measure identifies a second parameter value Thereby, a manner is provided by which to use game theory to adaptively select operational parameters used during operation of a radio communication system.

The preferred descriptions are of preferred examples for implementing the invention, and the scope of the invention should not necessarily be limited by this description. The scope of the present invention is defined by the following claims.

What is claimed is:

1. In a communication station having a receive portion operable to receive data communicated thereto upon a radio channel susceptible to distortion, an improvement of apparatus for facilitating selection of a value of a first parameter and a value of at least a second parameter by which to operate upon the receive data once received at the communication station, said apparatus comprising:

a first learning controller coupled to the receive portion to be provided with a performance measure representative of operation of the receive portion upon a set of successively-received sequences of the receive data received at the communication station, said first learning controller for iteratively selecting the value of the first parameter responsive to the performance measure associated with each of the successively-received sequences of the set, each successive performance measure identifying a first parameter value; and at least a second learning controller also coupled to the receive portion to be provided with the performance measure representative of operation of the receive portion upon the set of the successively-received sequences of the receive data received at the communication station, said second learning controller for iteratively selecting the value of the second parameter responsive to the performance measure associated with each of the successively-received sequences of the set, each successive performance measure identifying a second parameter value, wherein the performance measure responsive to which said first learning controller and said at least second learning controller iteratively select the value of the first parameter and the value of at least the second parameter comprises a data throughput indicia of the receive data received at the received portion of the communication station.

2. The apparatus of claim 1 wherein said at least second learning controller comprises said second learning controller and at least a third learning controller, said third learning controller for iteratively selecting the value of a third parameter value responsive to the performance measure associated with each of the successively-received sequences of the set, each successive performance measure identifying a third parameter value.

3. The apparatus of claim 1 wherein the receive data is formatted into successive frames of receive data and wherein each sequence of the receive data operated upon by the receive portion and of which the performance measure representative of operation thereon by the receive portion is provided to said first learning controller and said at least second learning controller, respectively comprises a frame of the receive data.

4. The apparatus of claim 1 wherein said first learning controller further comprises a first memory device for storing a first set of responsive-actions, said first learning controller further for iteratively selecting a first selected responsive-action of the first set of responsive-actions responsive to the performance measure provided thereto and associated with each of the successively-received sequences of the set.

5. The apparatus of claim 4 wherein said first learning controller comprises a first algorithm executable at a processing device, the first algorithm defining a linear reward/penalty (LRP) scheme.

6. The apparatus of claim 5 wherein the first algorithm further defines a linear reward/$\epsilon$ penalty (LR$\epsilon$P) scheme.

7. The apparatus of claim 6 wherein the first algorithm further defines a linear reward inaction (LRI) scheme.

8. The apparatus of claim 4 wherein said second learning controller further comprises a second memory device for storing a second set of responsive-actions, said second learning controller further for iteratively selecting a second selected responsive-action of the second set of responsive-actions responsive to the performance measure provided thereto and associated with each of the successively-received sequences of the set.

9. The apparatus of claim 8 wherein said second learning controller comprises a second algorithm executable at a processing device, the second algorithm defining a linear reward/penalty (LRP) scheme.

10. The apparatus of claim 8 wherein the said second learning controller comprises a second algorithm executable at a processing device, the second algorithm defining a linear reward/$\epsilon$ penalty (LR$\epsilon$P) scheme.

11. The apparatus of claim 8 wherein said second learning controller comprises a second algorithm executable at a processing device, the second algorithm defining a linear reward inaction (LRI) scheme.

12. The apparatus of claim 8 wherein the communication station is operable in a radio communication system in which the receive data communicated to the radio communication station is modulated pursuant to an adaptive modulation scheme, the receive data selectably modulated pursuant to a first modulation format, a second modulation format, and at least a third modulation format, the first modulation format used during first channel distortion conditions, the second modulation format used during second channel distortion conditions, and the third modulation format is used during third channel distortion conditions, the first selected responsive-action selected by said first learning controller defining a first-selected boundary value defining a first-selected boundary value defining a first boundary, defined in terms of the performance measure, separating the first channel distortion conditions and the second channel distortion conditions, the second selected responsive-action selected by said second learning controller defining a second-selected boundary value defining a second boundary, defined in terms of the performance measure, separating the second channel distortion conditions and the third channel distortion conditions.

13. The apparatus of claim 8 wherein said first learning controller and said second learning controller operate independent and cooperatively to select the first selected responsive-action and to select the second selected responsive-action, respectively.

14. In a method for communicating at a communication station having a receive portion operable to receive data communicated thereto upon a channel susceptible to distortion, an improvement of a method for facilitating selection of a value of a first parameter and a value of at least a second parameter by which to operate upon the receive data once received at the communication station, said method comprising:

iteratively selecting a value of a first parameter responsive to a performance measure associated with each successively-received sequence of a set of successively received sequences received at the receive portion, each successive performance measure identifying a first parameter value; and iteratively selecting a value of a second parameter responsive to the performance measure associated with each successively-received sequence of the set, each successive performance measure identifying a second parameter value, wherein iteratively selecting the value of the first parameter and iteratively selecting the value of the second parameter are responsive to a performance measure that comprises a data throughput indicia of the receive data received at the receive portion of the communication station.

15. The method of claim 14 wherein said operation of iteratively selecting the value of the first parameter and said operation of iteratively selecting the value of the second parameter are performed independently and cooperatively.

16. The method of claim 14 further comprising the operation, subsequent to said operation of iteratively selecting the value of the first parameter, of iteratively selecting a first-selected responsive action responsive to the performance measure associated with each of the successively-received sequences of the set.

17. The method of claim 14 further comprising the operation, subsequent to said operation of iteratively selecting the value of the second parameter, of iteratively selecting a second-selected responsive action responsive to the performance measure associated with each of the successively-received sequences of the set.

18. In a method for communicating at a communication station having a receive portion operable to receive data communicated thereto upon a channel susceptible to distortion, an improvement of a method for facilitating selection of a value of a first parameter and a value of at least a second parameter by which to operate upon the receive data once received at the communication station, said method comprising:
 iteratively selecting a value of a first parameter responsive to a performance measure associated with each successively-received sequence of a set of successively received sequences received at the receive portion, each successive performance measure identifying a first parameter value; and
 iteratively selecting a value of a second parameter responsive to the performance measure associated with each successively-received sequence of the set, each successive performance measure identifying a second parameter value,
 wherein iteratively selecting the value of the first parameter and iteratively selecting the value of the second parameter are responsive to the performance measure that comprises an error rate value indicative of errors contained in individual ones of the successively-received sequences of the set of the successively-received sequences of the receive data.

19. In a method for communicating at a communication station having a receive portion operable to receive data communicated thereto upon a channel susceptible to distortion, an improvement of a method for facilitating selection of a value of a first parameter and a value of at least a second parameter by which to operate upon the receive data once received at the communication station, said method comprising:
 iteratively selecting a value of a first parameter responsive to a performance measure associated with each successively-received sequence of a set of successively received sequences received at the receive portion, each successive performance measure identifying a first parameter value; and
 iteratively selecting a value of a second parameter responsive to the performance measure associated with each successively-received sequence of the set, each successive performance measure identifying a second parameter value,
 wherein iteratively selecting the value of the first parameter further comprises storing a first set of responsive-actions and iteratively selecting a first selected responsive-action of the first set of responsive-actions responsive to the performance measure and associated with each of the successively-received sequences of the set, and
 wherein the communication station is operable in a communication system in which the receive data communicated to the communication station is modulated pursuant to an adaptive modulation scheme, the receive data selectably modulated pursuant to a first modulation format, a second modulation format, and at least a third modulation format, the first modulation format used during first channel distortion conditions, the second modulation format used during second channel distortion conditions, and the third modulation format is used during third channel distortion conditions, the first selected responsive-action defining a first-selected boundary value defining a first boundary, defined in terms of the performance measure, separating the first channel distortion conditions and the second channel distortion conditions.

20. In a communication station having a receive portion operable to receive data communicated thereto upon a radio channel susceptible to distortion, an improvement of apparatus for facilitating selection of a value of a first parameter and a value of at least a second parameter by which to operate upon the receive data once received at the communication station, said apparatus comprising:
 a first learning controller coupled to the receive portion to be provided with a performance measure representative of operation of the receive portion upon a set of successively-received sequences of the receive data received at the communication station, said first learning controller for iteratively selecting the value of the first parameter responsive to the performance measure associated with each of the successively-received sequences of the set, each successive performance measure identifying a first parameter value; and
 at least a second learning controller also coupled to the receive portion to be provided with the performance measure representative of operation of the receive portion upon the set of the successively-received sequences of the receive data received at the communication station, said second learning controller for iteratively selecting the value of the second parameter responsive to the performance measure associated with each of the successively-received sequences of the set, each successive performance measure identifying a second parameter value,
 wherein the performance measure provided to said first learning controller and to said at least second learning controller comprises an error rate value indicative of errors contained in individual ones of the successively-received sequences of the set of the successively-received sequences of the receive data.

21. In a communication station having a receive portion operable to receive data communicated thereto upon a radio channel susceptible to distortion, an improvement of apparatus for facilitating selection of a value of a first parameter and a value of at least a second parameter by which to operate upon the receive data once received at the communication station, said apparatus comprising:
 a first learning controller coupled to the receive portion to be provided with a performance measure representative of operation of the receive portion upon a set of successively-received sequences of the receive data received at the communication station, said first learning controller for iteratively selecting the value of the first parameter responsive to the performance measure associated with each of the successively-received sequences of the set, each successive performance measure identifying a first parameter value; and
 at least a second learning controller also coupled to the receive portion to be provided with the performance measure representative of operation of the receive portion upon the set of the successively-received sequences of the receive data received at the communication station, said second learning controller for iteratively selecting the value of the second parameter responsive to the performance measure associated with each of the successively-received sequences of the set, each successive performance measure identifying a second parameter value,
 wherein said first learning controller further comprises a first memory device for storing a first set of responsive-actions, said first learning controller further for iteratively selecting a first selected responsive-action of the first set of responsive-actions responsive to the performance measure provided thereto and associated with each of the successively-received sequences of the set and wherein the communication station is operable in a communication system in which the receive data communicated to the communication station is modulated pursuant to an adaptive modulation scheme, the receive data selectably modulated pursuant to a first modulation format, a second modulation format, and at least a third modulation format, the first modulation format used during first channel distortion conditions, the second modulation format used during second channel distortion conditions, and the third modulation format is used during third channel distortion conditions, the first selected responsive-action selected by said first learning controller defining a first-selected boundary value defining a first boundary, defined in terms of the performance measure, separating the first channel distortion conditions and the second channel distortion conditions.

* * * * *